(12) United States Patent
Sato et al.

(10) Patent No.: US 12,427,931 B2
(45) Date of Patent: Sep. 30, 2025

(54) ARTICLE SUPPORTING DEVICE

(71) Applicants: SUBARU CORPORATION, Tokyo (JP); NIFCO INC., Yokosuka (JP)

(72) Inventors: Akihiko Sato, Tokyo (JP); Kanenori Susaki, Tokyo (JP); Yuhei Chinomi, Yokosuka (JP)

(73) Assignees: SUBARU CORPORATION, Tokyo (JP); NIFCO INC., Yokosuka (JP)

( * ) Notice: Subject to any disclaimer, the term of this patent is extended or adjusted under 35 U.S.C. 154(b) by 37 days.

(21) Appl. No.: 18/416,348

(22) Filed: Jan. 18, 2024

(65) Prior Publication Data

US 2024/0326710 A1 Oct. 3, 2024

(30) Foreign Application Priority Data

Mar. 28, 2023 (JP) .................................. 2023-051038

(51) Int. Cl.
*B60R 11/00* (2006.01)

(52) U.S. Cl.
CPC ....... *B60R 11/00* (2013.01); *B60R 2011/0003* (2013.01); *B60R 2011/0052* (2013.01)

(58) Field of Classification Search
CPC ............. B60R 11/00; B60R 2011/0003; B60R 2011/0052
USPC ....................................................... 248/205.1
See application file for complete search history.

(56) References Cited

U.S. PATENT DOCUMENTS

| 4,284,378 A | * | 8/1981 | Mizusawa | ............. | F16B 37/043 411/21 |
| 9,155,362 B2 | * | 10/2015 | Shimizu | .................. | F16B 21/08 |
| 2022/0105765 A1 | * | 4/2022 | Watanabe | ................. | F16F 9/54 |

FOREIGN PATENT DOCUMENTS

JP 7055114 B2 4/2022

* cited by examiner

*Primary Examiner* — Anita M King
(74) *Attorney, Agent, or Firm* — HAUPTMAN HAM, LLP (57) ABSTRACT

An article supporting device includes a main receptacle having a receptive opening for an article to be supported; and a bolt assembly having a bolt shaft and a bolt head, the bolt shaft being configured to be fixed to a vehicle body, the bolt head being combined with the main receptacle so as to be positioned in the main receptacle. The main receptacle is configured to include a receptive space between the receptive opening and the bolt head of the bolt assembly. The bolt head of the bolt assembly has an open portion disposed so as to face the receptive space, the bolt head having a sub-receptive space formed therein so as to be continuous with the receptive space.

5 Claims, 15 Drawing Sheets

ARTICLE SUPPORTING DEVICE

RELATED APPLICATIONS

The present application is based on, and claims priority from, Japanese Application No. JP2023-051038 filed Mar. 28, 2023, the disclosure of which is hereby incorporated by reference herein in its entirety.

TECHNICAL FIELD

The present invention relates to an improved article supporting device, which may be disposed in a vehicle cabin as needed to support an article in the cabin.

BACKGROUND

Patent document 1 listed below discloses an article supporting device, which is disposed in a vehicle cabin by having a bolt assembly fixed to a vehicle body, the bolt assembly being integral with a resin molding.

In the article supporting device disclosed in Patent Document 1, the resin molding includes a base portion and an annular portion. The base portion and the annular portion are configured to be both integrated together with an intermediate portion disposed therebetween to define a hollow space such that the annular portion serves as an inlet while the base portion has a surface serving as a depth wall. An article to be supported can be put into the hollow space through the inlet such that the load of the article is directly applied to the resin molding.

Patent Document 1: JP Patent No. 7055114

SUMMARY

According to one aspect of the present invention, there is provided an article supporting device including a main receptacle having a receptive opening for an article to be supported; and a bolt assembly having a bolt shaft and a bolt head, the bolt shaft being configured to be fixed to a vehicle body, the bolt head being combined with the main receptacle so as to be positioned in the main receptacle. The main receptacle is configured to include a receptive space between the receptive opening and the bolt head of the bolt assembly. The bolt head of the bolt assembly has an open portion disposed so as to face the receptive space such that the bolt head includes a sub-receptive space formed therein so as to be continuous with the receptive space.

In one mode of the present invention, the main receptacle comprises a resin, and the bolt assembly serves as an insert during molding of the main receptacle.

In this mode, the bolt assembly may have an inner surface, and the inner surface may have an area facing the sub-receptacle, at least the area being covered with the resin.

In another mode of the present invention, the main receptacle includes a base portion on an end opposite to the receptive opening, and the bolt assembly is configured to project the bolt shaft from the base portion with the bolt head being positioned in the main receptacle.

In still another mode of the present invention, the main receptacle has inner walls facing the receptive space such that the inner walls are slant so as to be closer toward a center of the receptive space.

The article supporting device according to the one aspect of the present invention can make use of the sub-receptacle of the bolt assembly to support an article to be supported. The load of the article can be directly applied to a vehicle body through the bolt assembly without being applied to the main receptacle. This arrangement can minimize the occurrence of, e.g., damage of the main receptacle even when the load is high.

DETAILED DESCRIPTION

Now, a typical embodiment of the present invention will be described in reference to FIGS. 1 to 16.

Figure 15:
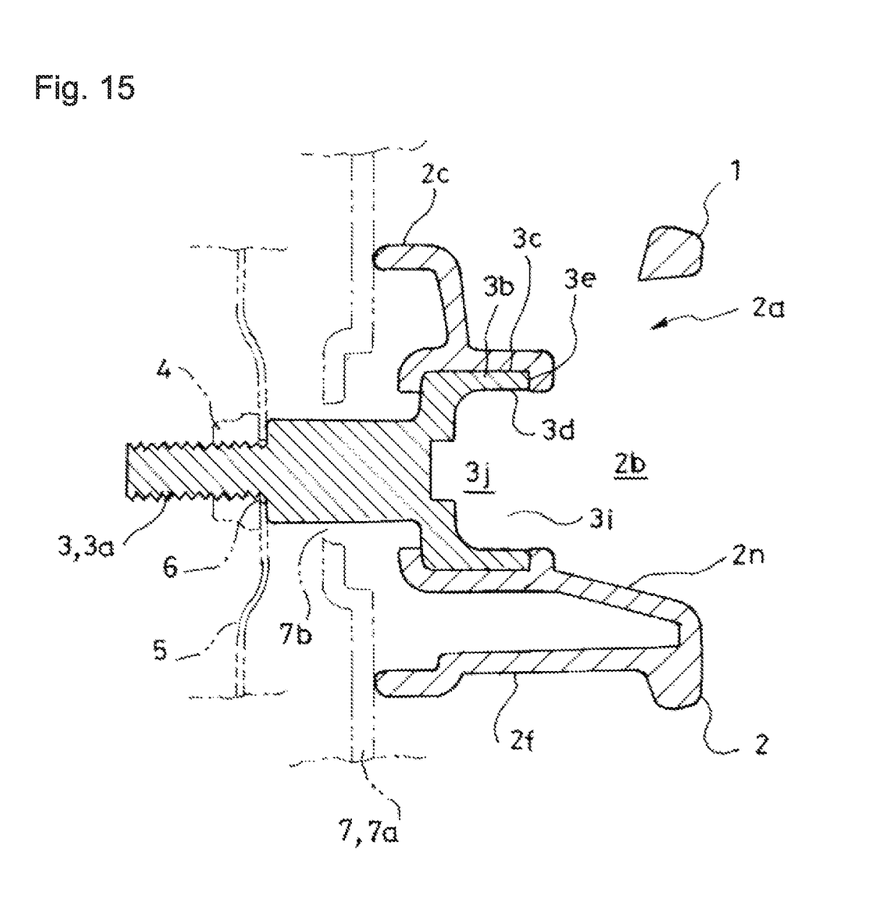
FIG. 15 is a cutting end view illustrating how to use another article supporting device (second example) according to the embodiment of the present invention.
Figure 16:
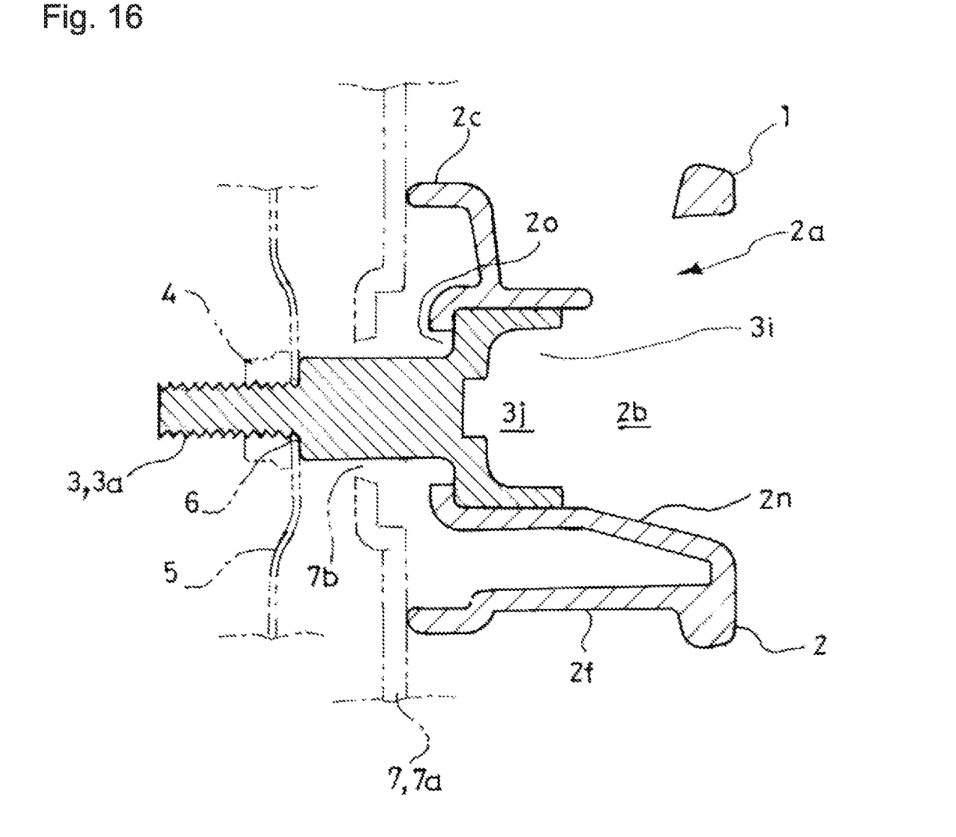
FIG. 16 is a cutting end view illustrating how to use another article supporting device (third example) according to the embodiment of the present invention.

FIGS. 1-14 illustrate a first example of the article supporting device according to the embodiment. FIG. 15 illustrates a second example of the article supporting device according to the embodiment. FIG. 16 illustrates a third example of the article supporting device according to the embodiment. Regarding members or elements according to the second example shown in FIG. 15 and the third example shown in FIG. 16, members or elements identical or substantially identical to those of the first example shown in FIGS. 1-14 are indicated with like references. Explanation of those members or elements will be omitted.

The article supporting device 1 according to the embodiment may be disposed in a vehicle cabin as needed to be used for supporting a desired article in the cabin.

Figure 10:
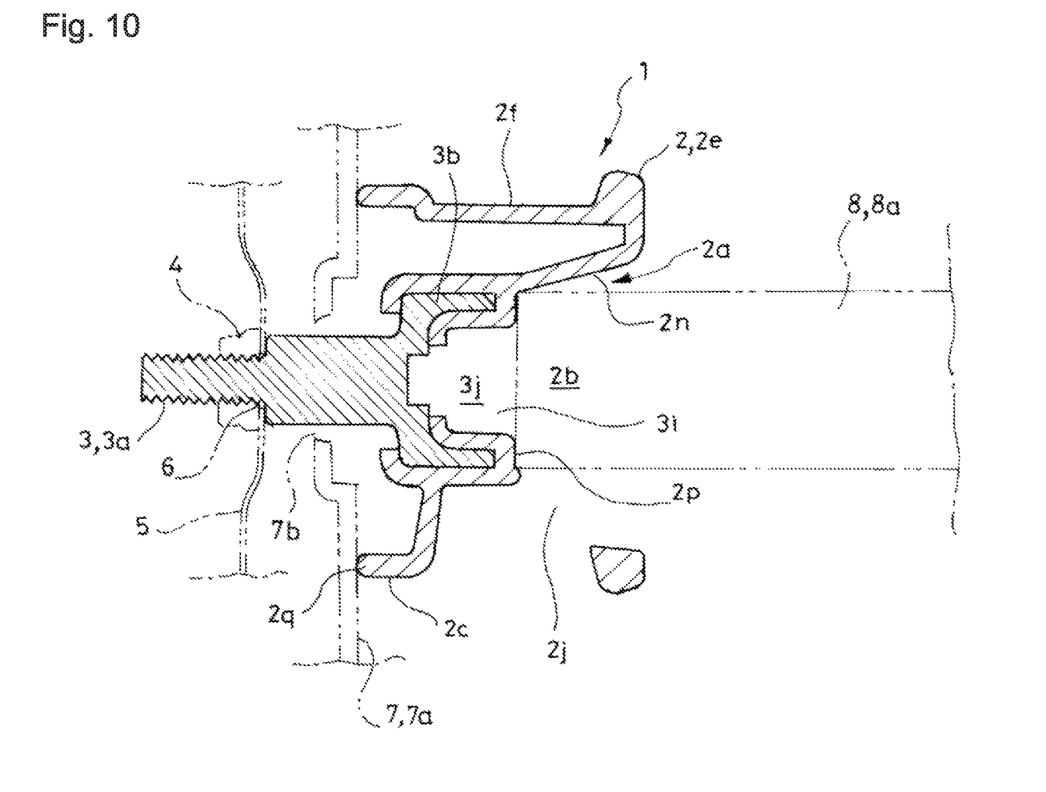
FIG. 10 is a cutting end view illustrating how to use the first example.

Typically, the article supporting device 1 may be disposed on a cabin wall 7, making use of a mounting hole 6 formed in a vehicle body 5 (see FIGS. 10, 15 and 16). The article supporting device 1 may be disposed so as to have a main receptacle 2 projecting from a wall surface of the wall 7.

The article supporting device 1 thus disposed may be utilized to directly suspend an article to be supported 8, such as a shopping bag, on the wall 7.

Figure 12:
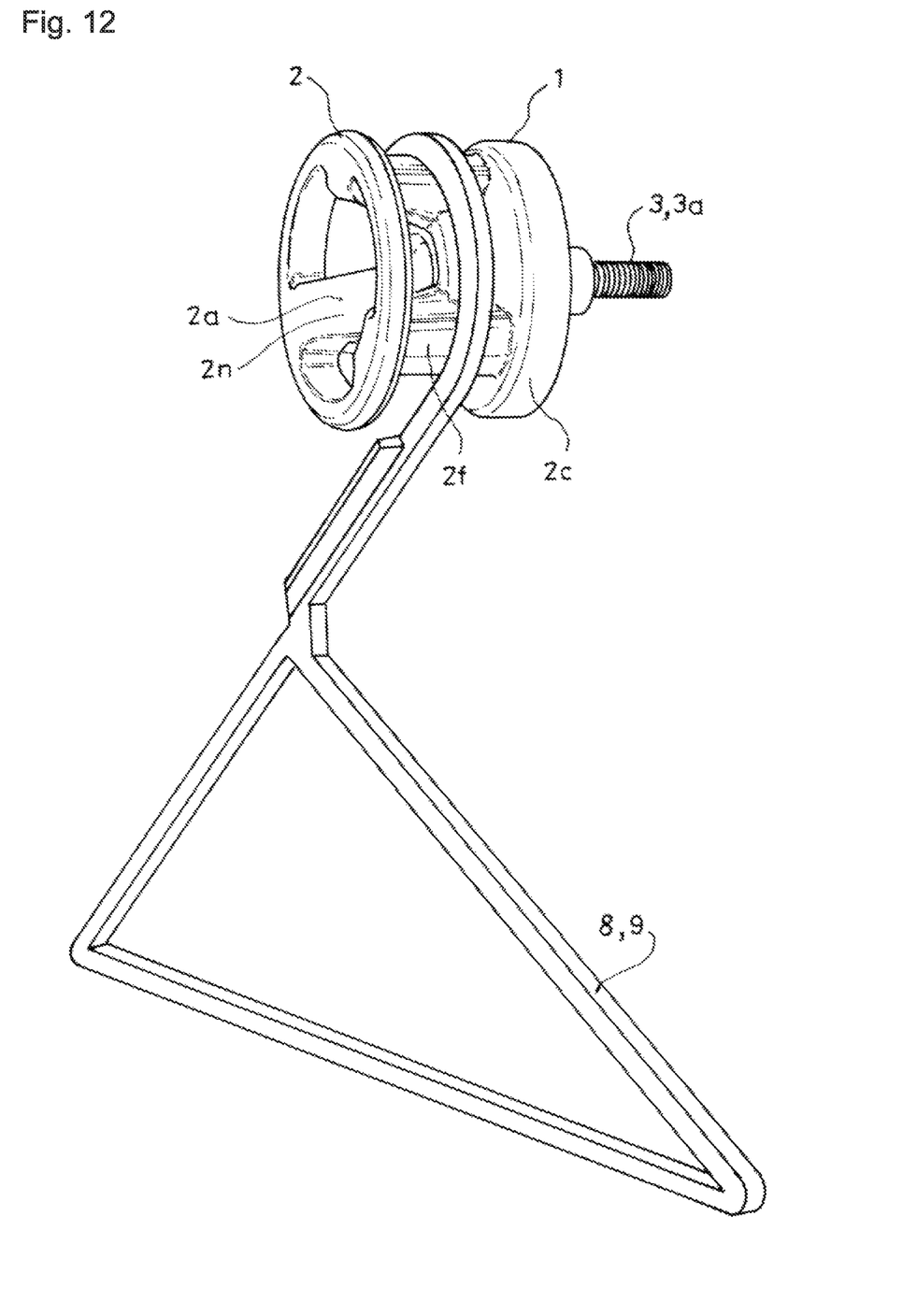
FIG. 12 is a perspective view illustrating how to use the first example.
Figure 13:
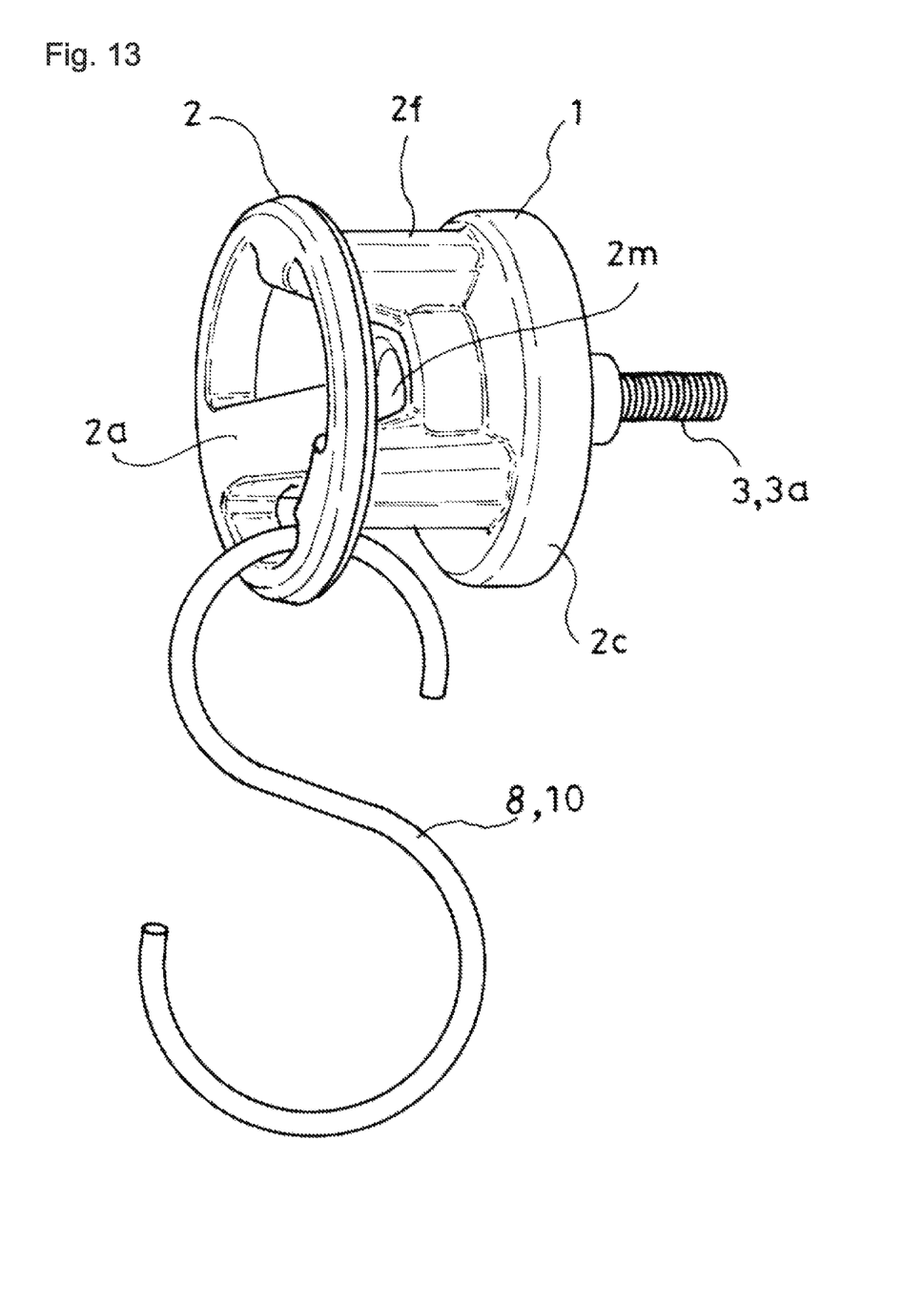
FIG. 13 is another perspective view illustrating how to use the first example.

As shown in FIGS. 12 and 13, any kind of articles may be indirectly suspended on the wall 7 via, e.g., a hanger 9 or an S-shape hook 10 as the article to be supported 8.

Figure 14:
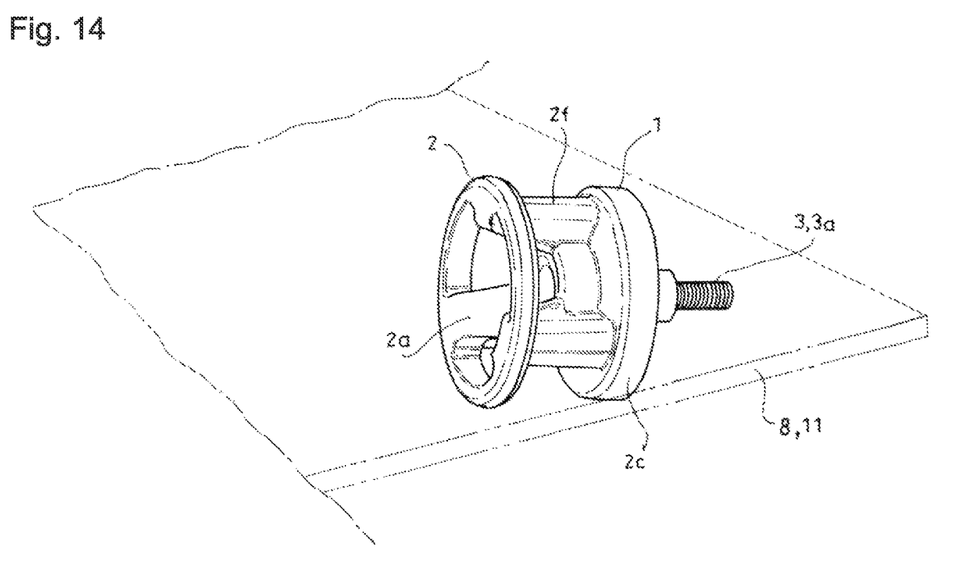
FIG. 14 is another perspective view illustrating how to use the first example.

As shown in FIG. 14, the article supporting device 1 may be disposed on each of opposed walls 7 in a cabin to support a shelf board 11 as the article to be supported 8 in the cabin, making use of the article supporting device 1 disposed on each of the opposed walls 7.

Figure 11:
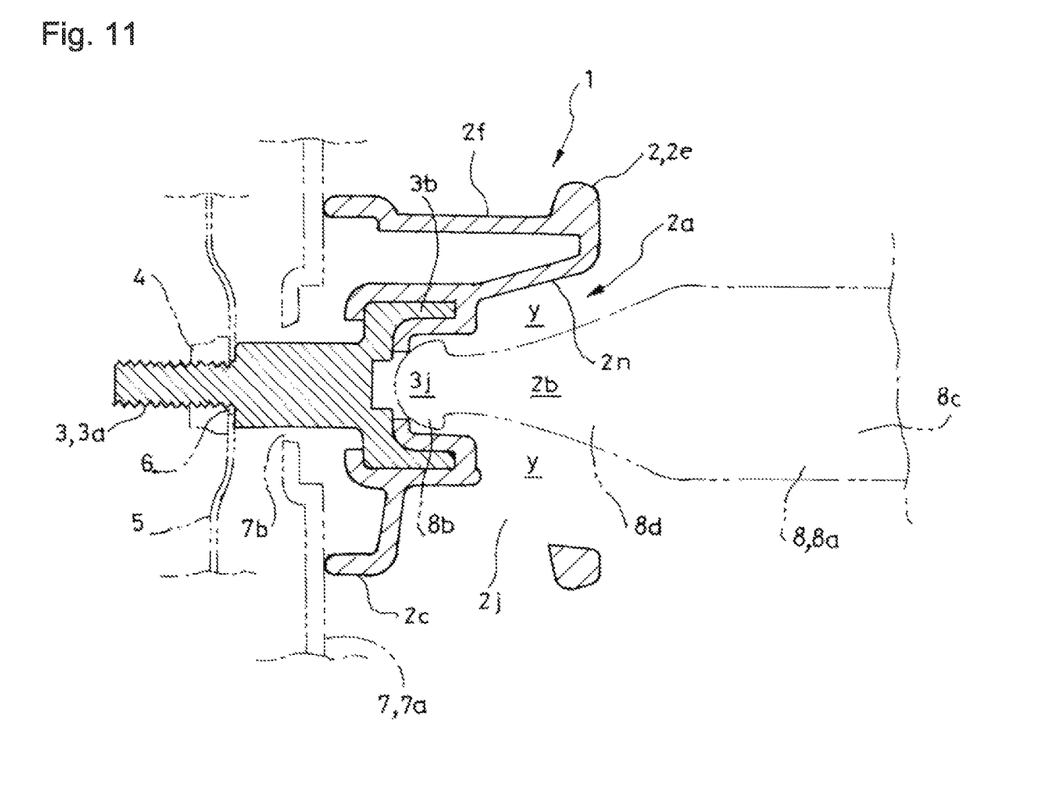
FIG. 11 is another cutting end view illustrating how to use the first example.

The article supporting device 1 may support an end portion of a bar member 8a as the article to be supported 8, in a receptive space 2b of the main receptacle 2 described later as shown in FIGS. 10 and 11.

The article supporting device 1 may include a sub-receptacle 3j as described later such that the end portion of the bar member 8a can be received in the sub-receptacle 3j through the receptive space 2b of the main receptacle 2 to support the bar member in the cabin without applying a load to the main receptacle 2.

The article supporting device 1 includes the main receptacle 2 and a bolt assembly 3.

The main receptacle 2 includes a receptive opening 2a for the article to be supported 8 such that the article to be supported 8, which is acceptable through the receptive opening 2a, can be received and supported in the main receptacle 2 as needed.

The bolt assembly 3 includes a bolt shaft 3a to be fixed to the vehicle body 5 and is combined with the main receptacle 2 so as to have a bolt head 3b positioned in the main receptacle 2.

The main receptacle 2 is configured such that the space between the receptive opening 2a of the main receptacle 2 and the bolt head 3b of the bolt assembly 3 positioned in the main receptacle 2 serves as the receptive space 2b of the main receptacle 2.

The main receptacle 2 includes a base portion 2c on an end thereof opposite to the receptive opening 2a, and the bolt assembly 3 is configured to project the bolt shaft 3a from the base portion 2c with the bolt head 3b being positioned in the main receptacle 2.

The article supporting device 1 is configured to be disposed in the cabin by screwing the bolt shaft 3a in the mounting hole 6 formed in the vehicle body 5 or by tightening a nut 4 on a projecting portion of the bolt shaft from the mounting hole 6 to clamp a portion of the vehicle body 5 between the base portion 2c and the nut 4 as shown in FIGS. 10, 15 and 16.

In the first example shown in FIGS. 1-14 and the second example shown in FIG. 15, the bolt assembly 3 is made of a metal, which is prepared as an insert during molding of the main receptacle 2 made of a synthetic resin. In other words, the main receptacle 2 is molded and integrated with the bolt assembly 3 by insert molding with the bolt assembly 3 being an insert.

In the third example shown in FIG. 16, the bolt assembly 3 is configured not only such that the bolt shaft 3a projects from the base portion 2c through a through hole 20 formed in the base portion 2c of the main receptacle 2 with the bolt head 3b being positioned in the main receptacle 2 but also such that the bolt shaft 3a is fixed to the vehicle body 5 by, e.g., screwing, as described above to bring the base portion 2c of the main receptacle 2 into close contact with the cabin wall 7.

Figure 7:
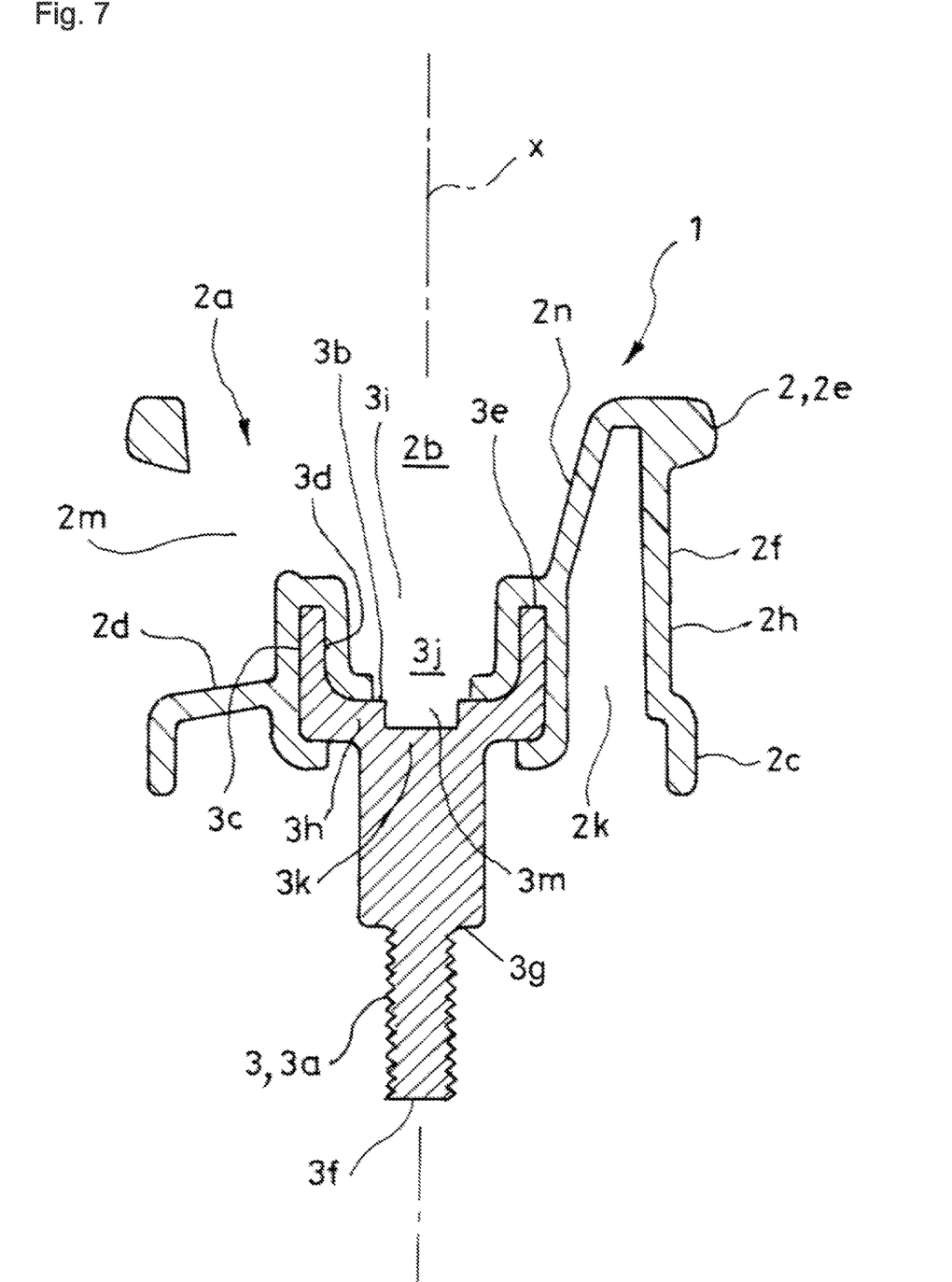
FIG. 7 is a cutting end view taken along line VII-VII of FIG. 3.

In the embodiment, the bolt shaft 3a of the bolt assembly 3 is configured to have a smaller diameter between a leading edge 3f and a position substantially half of the whole length of the bolt shaft than between the position substantially half of the whole length of the bolt shaft and the bolt head 3b and to have a circular step 3g formed at the position substantially half of the whole length of the bolt shaft as shown in FIG. 7. The bolt shaft 3a is fixed to the mounting hole 6 formed in a structural member of the vehicle body, which is disposed outside an interior panel 7a of the cabin. In this case, the bolt shaft 3a may be fixed such that only a portion of the bolt shaft ahead of the circular step 3g is placed into the mounting hole 6 through a through hole 7b formed in the interior panel 7a. This arrangement can prevent the main receptacle 2 from being excessively pressed against the interior panel 7a, such as a trim board, when the bolt assembly is fixed to the structural member of the vehicle body.

The main receptacle 2 includes the base portion 2c, an annular portion 2e and an intermediate portion 2f. The base portion 2c and the annular portion 2e are integrally molded with the intermediate portion 2f being disposed therebetween such that the annular portion 2e has an inner space serving as the receptive opening 2a.

In the shown embodiment, the base portion 2c is formed in a disk shape. The annular portion 2e is formed in an annular shape. The base portion 2c is configured to have substantially the same diameter as the annular portion 2e.

In the shown embodiment, the base portion 2c has an outer side formed so as to be concave except for an edge such that the edge has an annular raised portion 2q formed thereon. The base portion 2c is configured to be brought into contact with the vehicle body 5 at the annular raised portion 2q.

Figure 1:
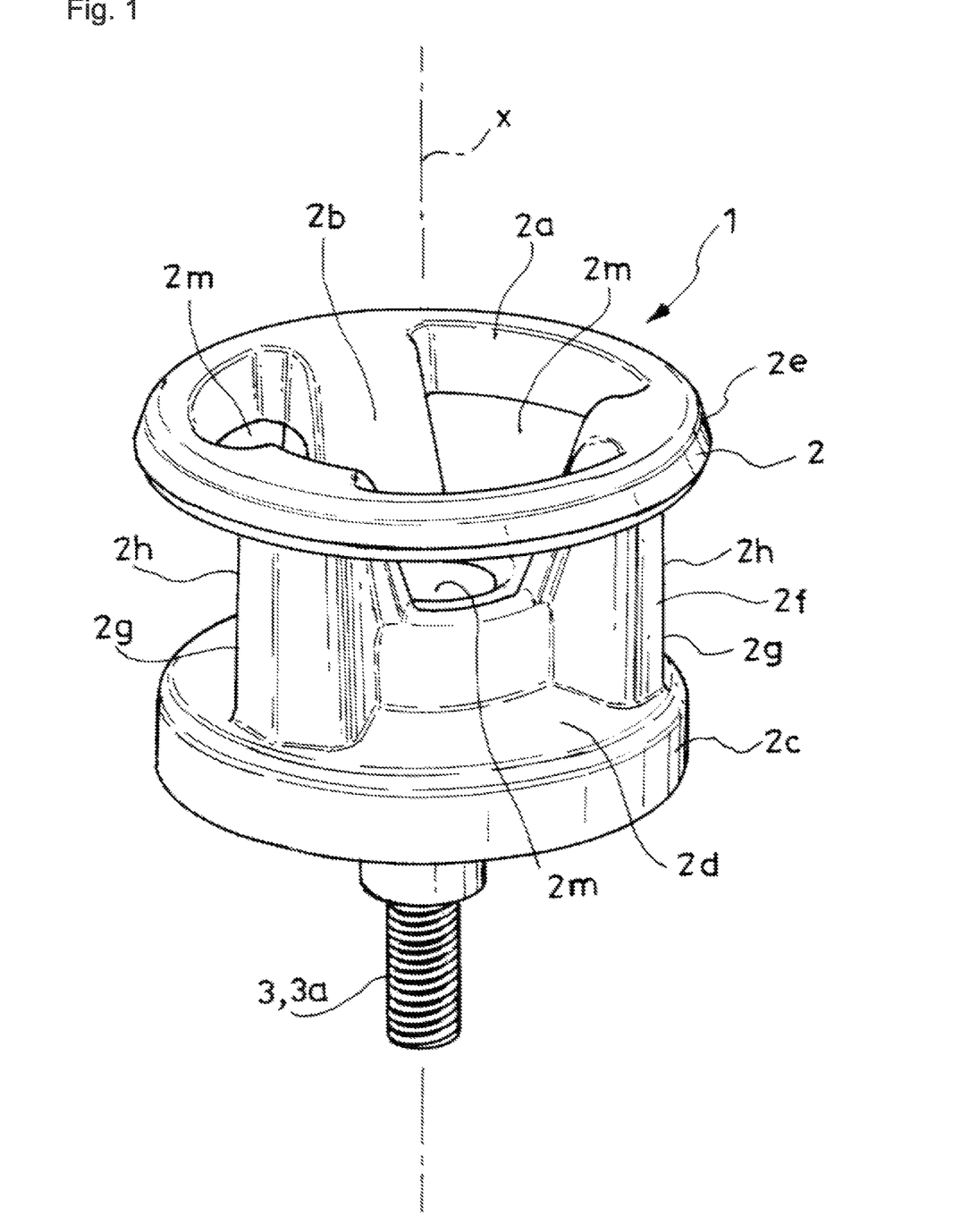
FIG. 1 is a perspective view illustrating an article supporting device (first example) according to an embodiment of the present invention.
Figure 2:
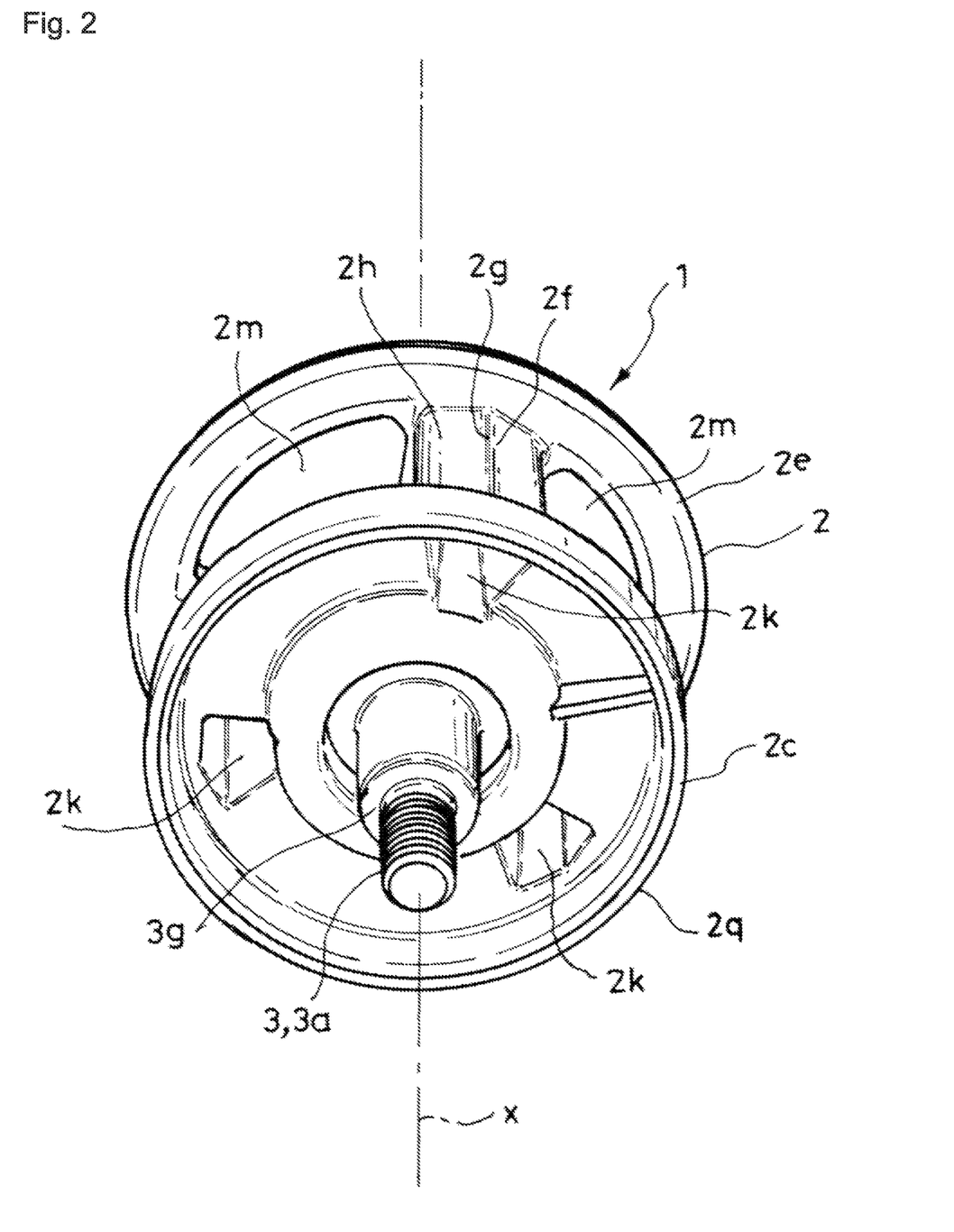
FIG. 2 is a perspective view illustrating the first example, where the first example is seen in an opposite direction from FIG. 1.
Figure 3:
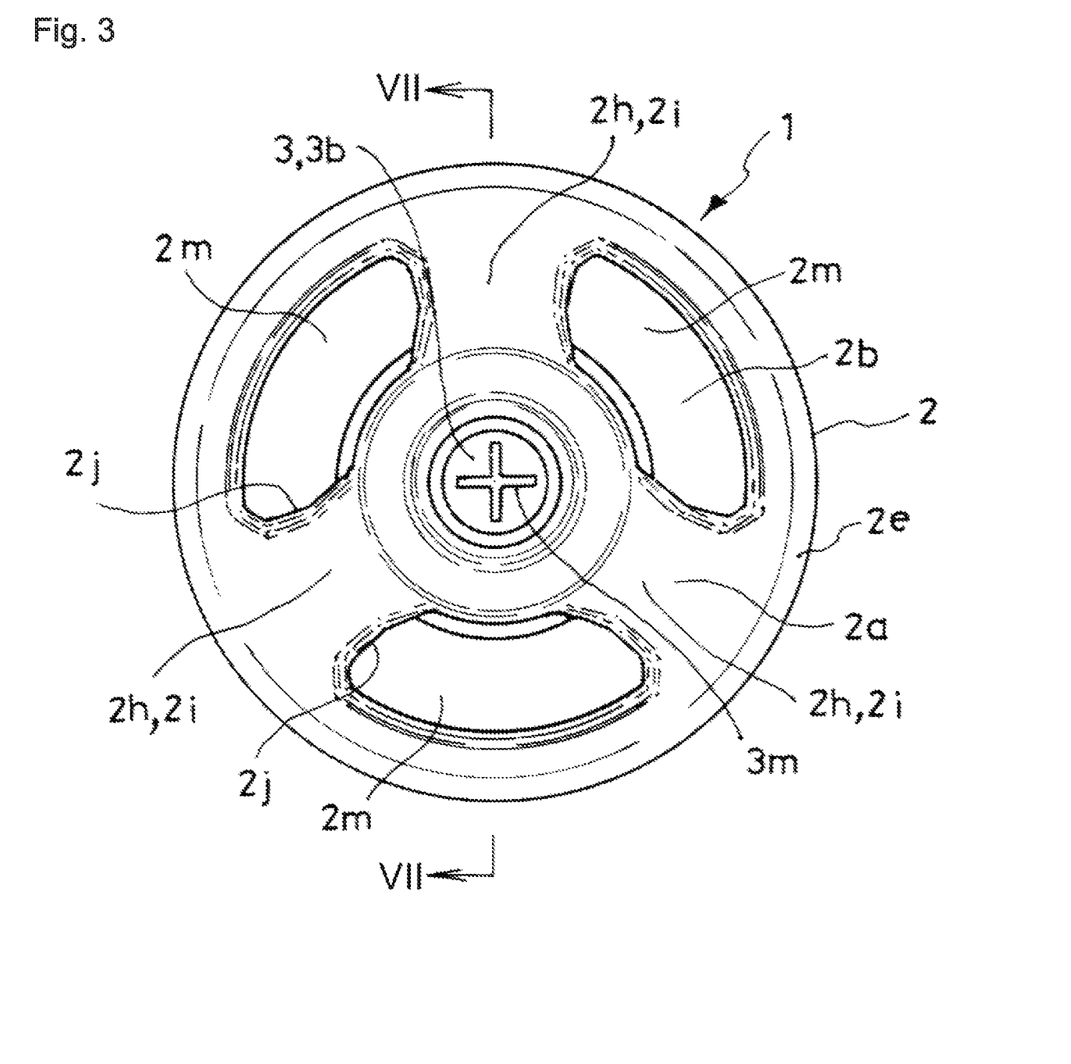
FIG. 3 is a plan view illustrating the first example.
Figure 4:
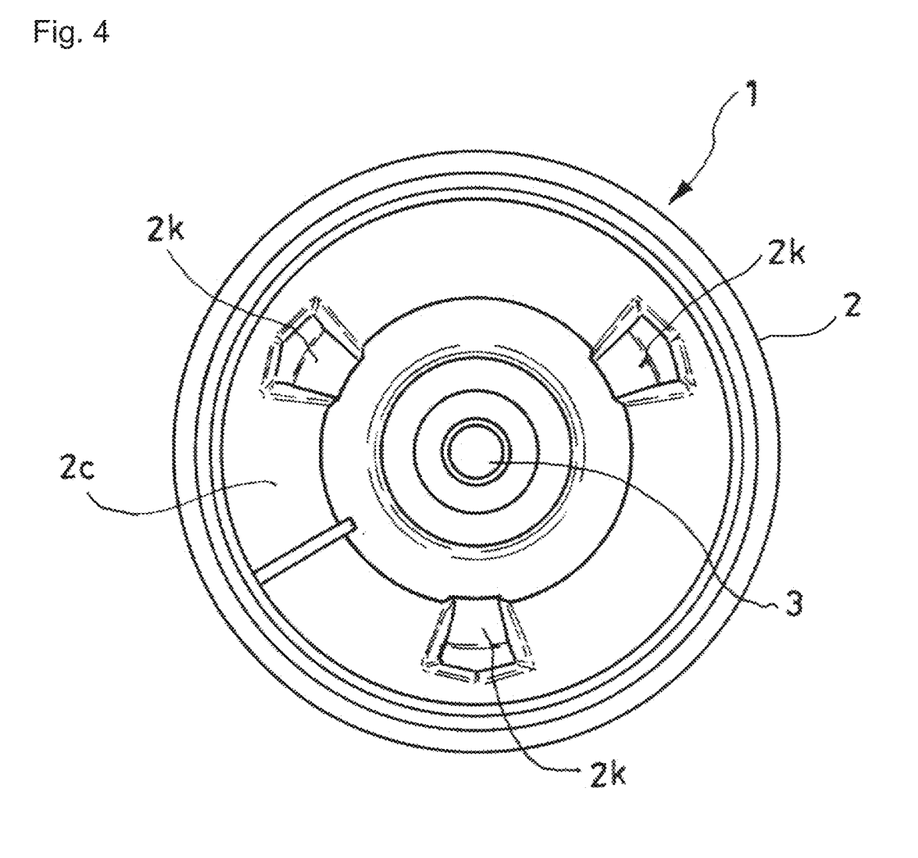
FIG. 4 is a bottom view illustrating the first example.
Figure 5:
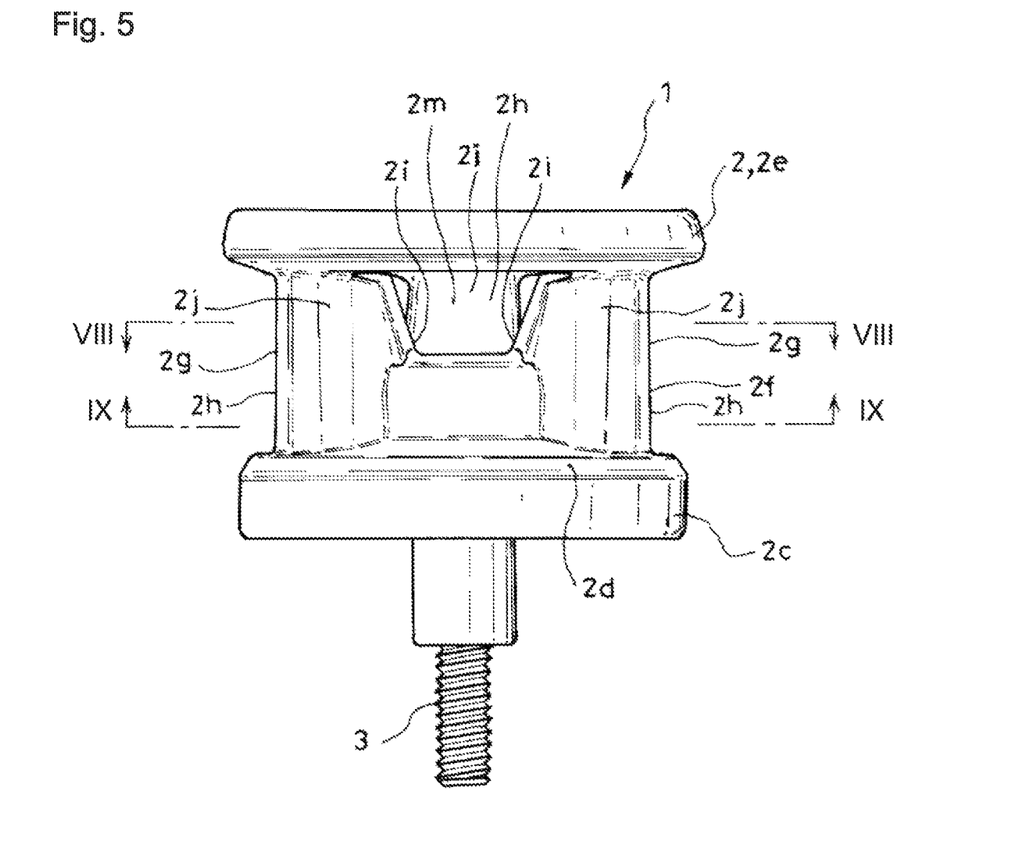
FIG. 5 is a side view illustrating the first example.
Figure 6:
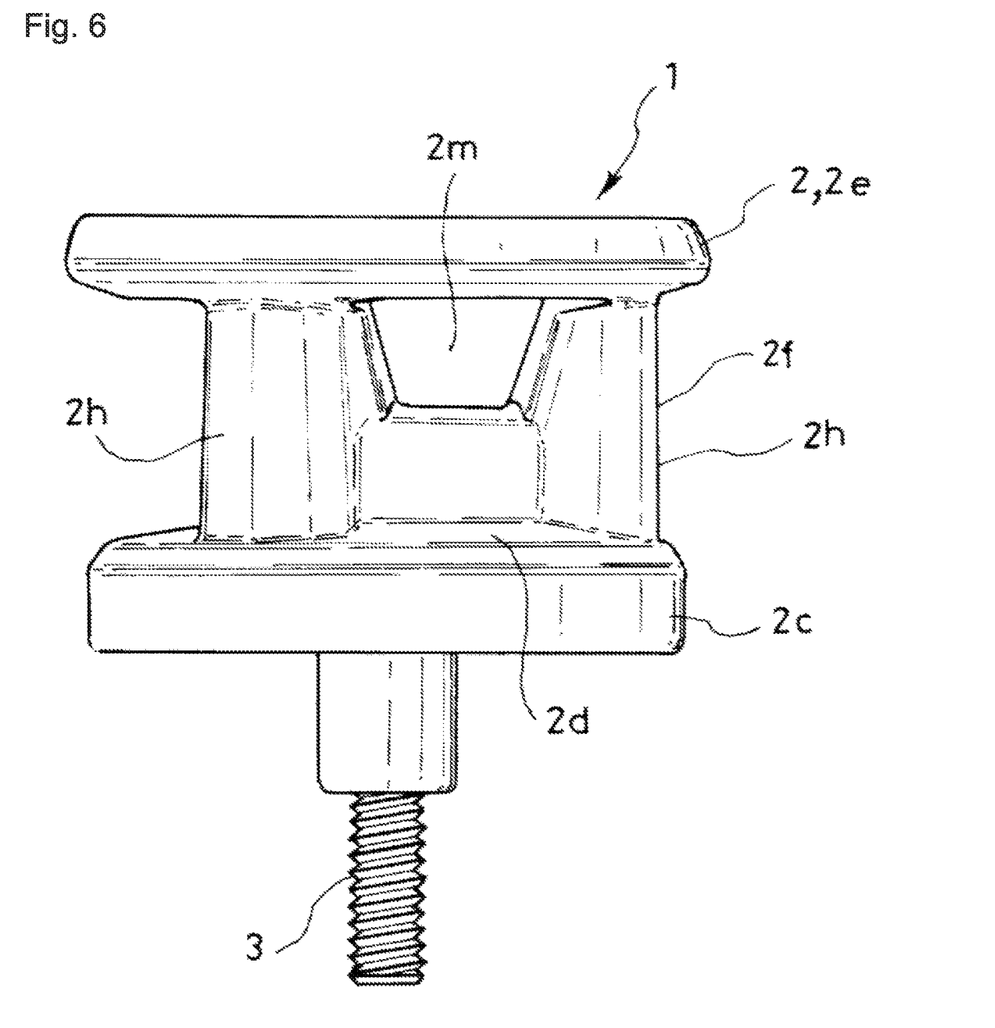
FIG. 6 is another side view illustrating the first example.

The base portion 2c, the annular portion 2e, the receptive space 2b, and the bolt head 3b and the bolt shaft 3a of the bolt assembly 3 have their centers disposed on a single imaginary straight line, i.e., a center axis x of the article supporting device (see FIGS. 1, 2 and 7).

The intermediate portion 2f is configured to have outer surfaces 2g positioned on arcs of an imaginary circle, which is concentric with the center axis x and has a slightly smaller diameter than the base portion 2c and the annular portion 2e.

By this arrangement, each of the base portion 2c and the annular portion 2e is formed in a flange shape such that a user can conveniently hook, e.g., a handle portion of the shopping bag on the intermediate portion 2f, which is formed as a narrowed portion between both of the base portion 2c and the annular portion 2e.

In the shown embodiment, the intermediate portion 2f includes a plurality of pillar members 2h, each of which has a first end integral with the base portion 2c and a second end integral with the annular portion 2e.

In the shown embodiment, the intermediate portion 2f includes three pillar members 2h, which are disposed, being spaced between adjacent pillar members 2h in a direction encircling the center axis x.

Figure 8:
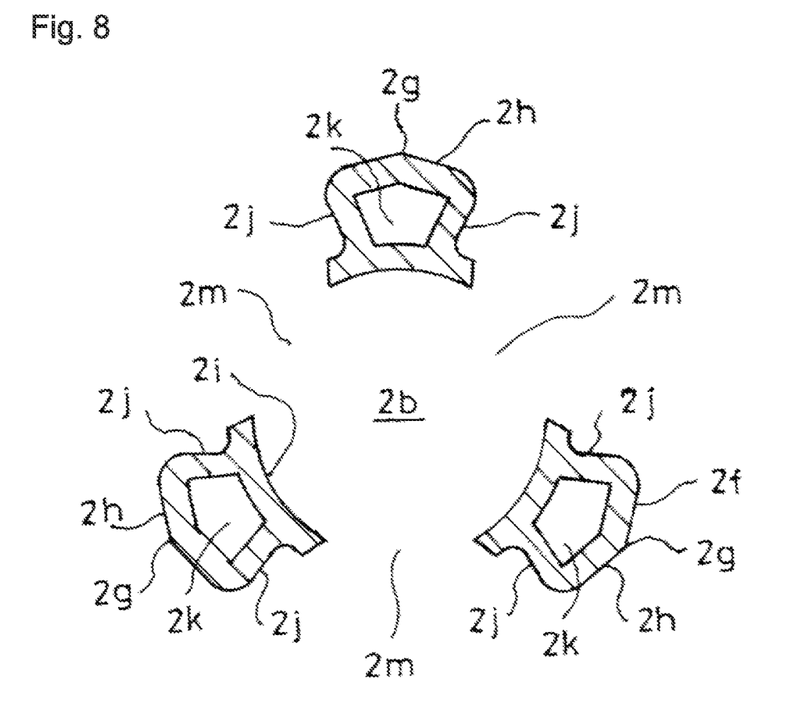
FIG. 8 is a cutting end view taken along line VIII-VIII of FIG. 5.
Figure 9:
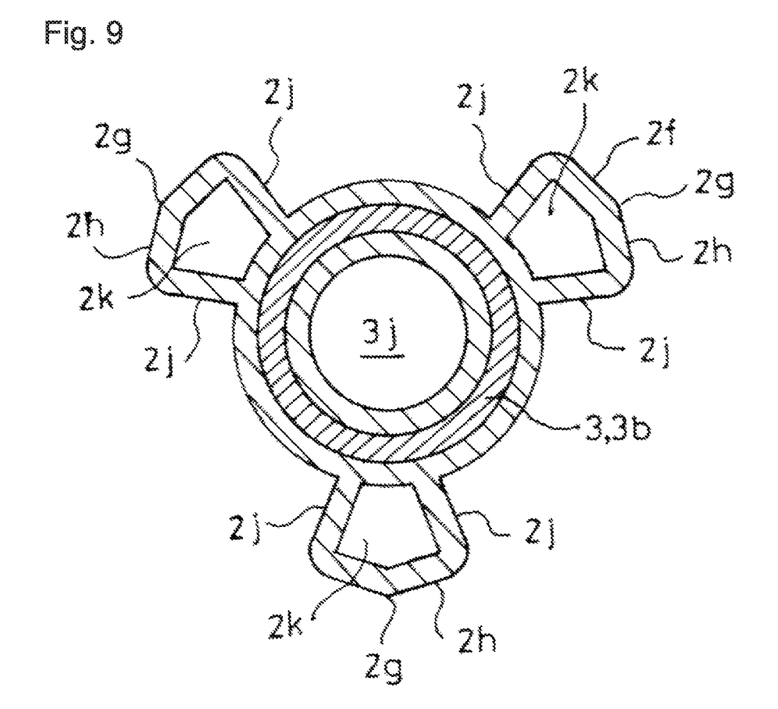
FIG. 9 is a cutting end view taken along line IX-IX of FIG. 5.

Each of the pillar members 2h includes an outer surface 2g, an inner surface 2i facing the receptive space 2b, and both side surfaces 2j disposed between the outer surface and the inner surface as shown in FIG. 8. The intermediate portion has an access opening 2m disposed between the side surfaces 2j of adjacent pillar members 2h so as to cause the receptive space 2b to communicate with outside. In the shown embodiment, the access openings 2m are formed in a window shape and are disposed at intervals of 120° in the direction encircling the center axis x. By this arrangement, a user can hook, e.g., an S-shape hook 10 with the main receptacle 2 by putting the hook into the receptive space 2b through the receptive opening 2a and passing the hook through an access opening 2m (see FIG. 13).

It should be noted that reference 2k denotes hollow spaces, which are open on the outer side of the base portion 2c and extend in the respective pillar members 2h.

In the shown embodiment, the bolt head 3b of the bolt assembly 3 projects to a position substantially half of the length of the pillar members 2h from an inner surface 2d of the base portion 2c facing the receptive space 2b. Each of the access openings 2m is a space surrounded by the bolt head 3b, adjacent pillar members 2h and the annular portion 2e.

In the shown embodiment, the bolt head 3b of the bolt assembly 3 is formed in a short cylindrical shape. The bolt head 3b has a first end closed by a disk portion 3h, which has a disk surface orthogonal to the center axis x. The bolt head 3b has a second end opened as an open portion 3i. The bolt head 3b houses the sub-receptacle 3j therein.

In the shown embodiment, it is shown that the bolt head 3b has a sectional contour formed in a circular shape in a direction orthogonal to the center axis x. The sectional contour may be formed in a polygonal shape in the direction orthogonal to the center axis x. The latter case can increase the integration between the bolt head 3s of the bolt assembly 3 and the main receptacle 3 when the bolt assembly 3 is molded into the main receptacle 2, being an insert as described above.

The bolt head 3b has a larger outer diameter than the bolt shaft 3a. The bolt shaft 3a has a shaft base end 3k integrally formed in a central area of an outer surface of the disk portion 3h of the bolt head 3b so as to be opposite to the leading edge 3f.

The disk portion 3h of the bolt head 3b has an engageable portion 3m formed in the central area so as to be engageable with a tool tip. In the shown embodiment, the engageable portion 3m is formed as a cross-shaped slot so as to receive the tip of a plus driver as the tool tip.

In the first example, the main receptacle 2 and the bolt assembly 3 are integrally molded such that the resin forming the main receptacle 2 wholly covers an outer surface 3c and an inner surface 3d of the bolt head 3b in the bolt assembly 3 extending the center axis x, a circular end surface 3e extending in a direction perpendicular to the center axis x so as to surround the open portion 3i, an inner surface area of the disk portion 3h except for the engageable portion 3m, and an outer edge of the outer surface of the disk portion 3h.

The bolt head 3b of the bolt assembly 3 is configured to dispose the open portion 3i so as to face the receptive space 2b and to make the sub-receptive space 3j continuous with the receptive space 2b as an inner space of the bolt head 3b. The bolt head 3b has an inner surface 3d. The inner surface 3d has an area facing the sub-receptacle 3j. At least the area is covered with the resin.

In the first example, the main receptacle 2 has inner walls 2n facing the receptive space 2b. The inner walls are slant so as to be closer toward the center of the receptive space 2b, in other words, the center axis x toward the open portion 3i of the bolt head 3b. In the shown first example, the inner walls 2n are formed by inner surfaces 2i of the pillar members 2h of the intermediate portion 2f. By this arrangement, the main receptacle 2 is configured to have the largest inner diameter at the receptive opening 2a and the smallest diameter in the vicinity of a circular step 2p (see FIG. 10) formed by the resin covering the circular end surface 3e of the bolt head 3b.

The sub-receptacle 2j, which has the inner surface 3d covered with the resin, has a smaller inner diameter than the main receptacle 2 in the vicinity of the circular step 2p.

In the first example, first, this arrangement can receive, in the receptive space 2b, an end portion of a bar member 8a having an outer diameter acceptable in the receptive space 2b of the main receptacle 2 and unacceptable in the sub-receptacle 3j to support the end portion of the bar member 8a (see FIG. 10).

Second, this arrangement can receive, in the sub-receptacle 3j, an end portion of a bar member 8a having an outer diameter acceptable in the sub-receptacle 3j, through the receptive space 2b and the open portion 3i to support the end portion of the bar member 8a. The bar member 8a can be smoothly received into the sub-receptacle 3j since the inner walls 2n of the main receptacle 2 are slant (see FIG. 11).

In the first example, the inner surface 3d of the sub-receptacle 3j is covered with the resin. Even when the bar member 8a is made of a metal, the bar member 8a can prevent from being brought into contact with the bolt assembly 3 made of a metal in such a manner that metal members are brought into direct contact. This arrangement can prevent a contact sound between metal members from being caused in the supporting state described above.

In the second example, the main receptacle 2 and the bolt assembly 3 are integrally molded such that the resin forming the main receptacle 2 wholly covers an outer surface 3c of the bolt head 3b in the bolt assembly 3 extending the center axis x, a circular end surface 3e extending in a direction perpendicular to the center axis x so as to surround the open portion 3i, and an outer edge of the outer surface of the disk portion 3h.

The bolt head 3b of the bolt assembly 3 is configured to dispose the open portion 3i so as to face the receptive space 2b and to make the sub-receptive space 3j continuous with the receptive space 2b as an inner space of the bolt head 3b.

In the second example as well, the main receptacle 2 has the inner walls 2n facing the receptive space 2b. The inner walls are slant so as to be closer toward the center of the receptive space 2b, in other words, the center axis x toward the open portion 3i of the bolt head 3b.

First, this arrangement can receive, in the receptive space 2b, an end portion of a bar member 8a having an outer diameter acceptable in the receptive space 2b of the main receptacle 2 and unacceptable in the sub-receptacle 3j to support the end portion of the bar member in the second example as well.

Second, this arrangement can receive, in the sub-receptacle 3j, an end portion of a bar member 8a having an outer diameter acceptable in the sub-receptacle 3j through the receptive space 2b and the open portion 3i to support the end portion of the bar member. The bar member 8a can be smoothly received into the sub-receptacle 3j since the inner walls 2n of the main receptacle 2 are slant.

In the third example shown in FIG. 16, the main receptacle 2 has the through hole formed in a central portion of the base portion 2c such that the through hole is sized to allow the bolt shaft 3a of the bolt assembly 3 to pass therethrough, but instead, prevent the bolt head 3b from passing therethrough.

The bolt assembly 3 can not only be received in the receptive space 2b of the main receptacle 3 with the bolt shaft 3a foremost but also pass the bolt shaft 3a through the through hole 20 up to a position where the outer surface of the disk portion 3h of the bolt head 3b is brought into contact with the base portion 2c of the main receptacle 2.

When the bolt shaft 3a has passed through the through hole 20, the open portion 3i of the bolt head 3b of the bolt assembly 3 is positioned between the receptive opening 2a and the base portion 2c of the main receptacle 2 such that the receptive space 2c of the main receptacle 2 is defined between the open portion 3i and the receptive opening 2a.

In the third example as well, the main receptacle 2 has the inner walls 2n facing the receptive space 2b. The inner walls are slant so as to be closer toward the center of the receptive space 2b, in other words, the center axis x toward the open portion 3i of the bolt head 3b.

In the third example as well, first, this arrangement can receive, in the receptive space 2b, an end portion of a bar member 8a having an outer diameter acceptable in the receptive space 2b of the main receptacle 2 and unacceptable in the sub-receptacle 3j to support the end portion of the bar member.

Second, this arrangement can receive, in the sub-receptacle 3j, an end portion of a bar member 8a having an outer diameter acceptable in the sub-receptacle 3j through the receptive space 2b and the open portion 3i to support the end portion of the bar member. The bar member 8a can be smoothly received into the sub-receptacle 3j since the inner walls 2n of the main receptacle 2 are slant.

In each of the first example and the second example, the article supporting device 1 includes the bolt assembly 3 internal with the main receptacle 2. By this arrangement, the article supporting device may be disposed in a vehicle cabin by, e.g., holding and rotating the main receptacle 2 to screw the bolt shaft 3a of the bolt assembly 3 in the mounting hole 6 formed in the vehicle body 5 without using a mounting tool. When the article supporting device 1 is required to be removed, the article supporting device may be removed by holding and rotating the main receptacle 2 in a direction reverse to the rotation during mounting without using a mounting tool. Mounting and removing the article supporting device 1 may be made by making use of the engageable portion 3m to engage a suitable tool with the engageable portion 3m because the engageable portion 3m for the tip of a mounting tool, which is formed in the bolt head 3b of the bolt assembly 3, is exposed in the sub-receptacle 3j without being covered by the resin forming the main receptacle 2.

In any one of the first example, the second example and the third example, the load of the article to be supported 8, which is supported by the sub-receptacle 3j in the bolt head 3b of the bolt assembly 3, i.e., the load of the bar member 8a in the shown embodiment is applied directly to the vehicle body 5. This arrangement can minimize the occurrence of, e.g., damage of the main receptacle 2 even when the load is high, for example, even when the bar member 8a supports a heavy article in the vehicle cabin.

In the shown embodiment, as shown in a two-dot chai line in FIG. 11, the bar member 8a, which is supported by the sub-receptacle 3j in the bolt head 3b as described above, is configured to have a semi-spherical head 8b formed so as to be housed in the sub-receptacle 3j with almost no gap, a cylindrical body 8c and a truncated conical portion 8d connecting between the bolt head 3b and the cylindrical body 8c, the truncated conical portion 8a having an outer diameter gradually decreasing toward the bolt head 8b. The main receptacle 2 is configured such that a gap y is formed at any positions surrounding the center axis x between an outer surface of the truncated conical portion 8d and the inner walls 2n of the main receptacle 2 with the head 8b of the bar member 8a thus configured being housed in the sub-receptacle 3j. By making use of the gap y, the bar member 8a can be tiltably supported in a certain angular range so as to cross the center axis x with respect to a basic position having its centerline extending along the center axis x.

It should be noted that the present invention should not be construed to be limited to the embodiment and the examples described above, and that the present invention should be construed to encompass all embodiments capable of attaining the object of the present invention.

The entire disclosure of Japanese Patent Application No. 2023-051038 filed on Mar. 28, 2023 including specification, claims, drawings and summary is incorporated herein by reference in its entirety.

What is claimed is:

1. An article supporting device comprising:
a main receptacle having a receptive opening for an article to be supported; and
a bolt assembly having a bolt shaft and a bolt head, the bolt shaft being configured to be fixed to a vehicle body, the bolt head being combined with the main receptacle so as to be positioned in the main receptacle;
wherein the main receptacle is configured to include a receptive space between the receptive opening and the bolt head of the bolt assembly; and
wherein the bolt head of the bolt assembly has an open portion disposed so as to face the receptive space, the bolt head having a sub-receptive space formed therein so as to be continuous with the receptive space.

2. The article supporting device according to claim 1, wherein the main receptacle comprises a resin, and the bolt assembly serves as an insert during molding of the main receptacle.

3. The article supporting device according to claim 2, wherein the bolt assembly has an inner surface, the inner surface having an area facing the sub-receptive space, at least the area being covered with the resin.

4. The article supporting device according to claim 1, wherein the main receptacle includes a base portion on an end opposite to the receptive opening, and the bolt assembly is configured to project the bolt shaft from the base portion with the bolt head being positioned in the main receptacle.

5. The article supporting device according to claim 1, wherein the main receptacle has inner walls facing the receptive space such that the inner walls are slant so as to be closer toward a center of the receptive space.

* * * * *